United States Patent [19]

Hartz et al.

[11] 4,263,826
[45] Apr. 28, 1981

[54] TRANSMISSION WITH DUAL MODULATED SHIFT CONTROLS

[75] Inventors: James F. Hartz, Indianapolis; Reece R. Fuehrer, Danville; Elton L. Thompson, Indianapolis, all of Ind.

[73] Assignee: General Motors Corporation, Detroit, Mich.

[21] Appl. No.: 22,047

[22] Filed: Mar. 19, 1979

[51] Int. Cl.³ .............................................. B60K 21/00
[52] U.S. Cl. ...................................... 74/868; 74/864; 74/869
[58] Field of Search .................. 74/864, 865, 868, 869

[56] References Cited

U.S. PATENT DOCUMENTS

| | | | |
|---|---|---|---|
| 3,237,404 | 3/1966 | Flanigan et al. | 60/39.16 R |
| 3,583,154 | 6/1971 | Utter | 60/19 |
| 3,587,355 | 6/1971 | Schaefer | 74/868 |
| 3,593,599 | 7/1971 | Dach | 74/869 |
| 3,674,121 | 7/1972 | Copeland | 192/52 |
| 3,691,872 | 9/1972 | Schaefer et al. | 74/864 |
| 3,800,629 | 4/1974 | Lentz | 74/869 |
| 4,018,316 | 4/1977 | McQuinn et al. | 192/3.3 |
| 4,030,381 | 6/1977 | Lalin et al. | 74/867 |
| 4,036,083 | 7/1977 | McQuinn | 74/865 X |
| 4,047,454 | 9/1977 | McQuinn | 74/868 |
| 4,105,100 | 8/1978 | Iijima | 192/0.034 |

FOREIGN PATENT DOCUMENTS

1479791 7/1977 United Kingdom.

*Primary Examiner*—C. J. Husar
*Assistant Examiner*—Frank McKenzie
*Attorney, Agent, or Firm*—A. M. Heiter

[57] ABSTRACT

A multispeed transmission having an automatic shift control system having an automatic shift valve which is biased for upshift by a force increasing with output speed of the transmission and is biased for downshift by a force increasing concurrently with torque demand, to provide upshifts at speeds increasing with torque demand and downshifts at lower speeds. The shift valve controls the supply of shift fluid pressure to the ratio-engaging devices to establish low and high ratio drives. A regulator valve increases the shift fluid pressure with an increasing lagging torque demand signal. A modulator valve is controlled by an engine fuel feed or throttle to provide a concurrent torque demand signal pressure concurrent with throttle movement for the shift valve. The lagging torque demand signal is more concurrent with engine torque and power, such as the gasifier pressure of a gas turbine engine, or the supercharger pressure of an internal combustion engine. The transmission is shifted immediately in response to torque demand, and the shift pressure is proportional to the engine torque and speed at the time of the shift.

12 Claims, 5 Drawing Figures

TRANSMISSION WITH DUAL MODULATED SHIFT CONTROLS

FIELD OF THE INVENTION

This invention relates to automatic transmissions and, more particularly, to automatic speed and torque demand controlled shift systems with torque demand control of engagement pressure.

BACKGROUND OF THE INVENTION

Automatic transmissions now employ an automatic shift valve having a governor pressure providing a force in an upshift direction and a spring bias force, and torque demand pressures providing a net force in a downshift direction in order to provide upshifts at transmission output speeds, which increase as throttle or torque demand on the engine is increased, and downshifts at downshift speeds of a lower value and increasing at the same, a lower, or a higher rate as torque demand increases from zero to full-throttle. The difference between the upshift and downshift speeds at each torque demand value respectively remains the same, increases or decreases with increasing torque demand. Thus at higher speeds and higher torque demands, such transmissions provide shifting respectively having the same, less or more sensitivity to changes in throttle position. Transmission shift controls which provide a decreasing difference between upshift speed and downshift speed with increasing torque demand are used to provide high performance and reduced power loss during shifting. In these automatic shifting transmissions, the same torque demand signal is used to provide either a directly or inversely proportional torque demand pressure to control the automatic shift valves and to provide a ratio drive engaging pressure increasing with increasing torque demand.

SUMMARY OF THE INVENTION

This invention provides a change-speed transmission having an automatic shift control system including a shift valve controlled by a speed-responsive signal and a first torque demand signal for automatic shifting, and a regulator valve providing a shift or drive engaging pressure controlled by a second torque demand signal to increase with increasing torque demand for operating the ratio drive establishing friction devices. The first or concurrent torque demand signal is substantiallay simultaneous with torque demand which is preferably provided by a throttle control or other fuel feed control. The second or lagging torque demand signal is more or substantially concurrent with engine or input torque to the transmission. When the transmission is operating under steady-state first torque demand conditions and a change of speed effects a shift, the second torque demand signal is concurrent with the first torque demand signal and will regulate the shift pressure proportional to input torque at the time of the shift for a smooth shift. When the fuel feed, and thus the first torque demand signal, is quickly changed by a sufficient degree to immediately effect a shift at a constant speed, the shift occurs before the engine has had time to change input torque in response to the change of the fuel feed. Under these conditions, the second lagging torque demand signal, which is substantially concurrent with actual input torque, regulates the shift pressure in proportion to actual input torque at the time of the shift to provide a smooth shift. Thus when operating at a low fuel feed and low torque and the fuel feed is quickly increased to a higher value or full-throttle for maximum acceleration, the increased first torque demand signal may concurrently downshift the shift valve and the transmission from a higher to a lower ratio drive before the engine, in response to increased fuel feed, provides increased torque. Since the second torque demand signal varies substantially with actual engine torque and the regulator valve regulates drive engagement pressure in response to the second torque demand signal, the lower ratio drive is engaged at a low pressure concurrent with actual engine torque at the time of the shift for a smooth shift. The shift pressure increases with actual engine torque and time for a smooth increase of drive torque concurrent with increasing engine torque. A throttle modulator valve is controlled by a throttle pedal or other fuel feed controlled linkage to provide the first torque demand signal concurrent with torque demand. The gas pressure modulator valve is controlled by a signal substantially concurrent with actual engine torque, such as the compressor discharge pressure of a gas turbine engine or the supercharger pressure of a supercharged internal combustion engine.

The transmission has a main starting and lockup clutch whose engagement for initiating vehicle drive is controlled by advancing the engine throttle to increase fuel feed and engine torque, to increase the second torque demand signal to increase the apply pressure for clutch engagement concurrently with, or preferably a short time delay period after, the increase of actual engine torque for smooth clutch engagement with controlled slip.

These and other features and advantages of the invention will be more apparent from the following detailed description of the preferred embodiments and the accompanying drawings.

DESCRIPTION OF PREFERRED EMBODIMENTS

A suitable known engine and control are shown in U.S. Pat. No. 3,237,404 Flanigan et al., dated Mar. 1, 1966, and such an engine with compressor discharge pressure used in the transmission controls is shown and described in U.S. Pat. No. 4,018,316 McQuinn et al., dated Apr. 19, 1977.

While the invention is intended for use in multispeed transmissions, such as the three-speed transmission of the above U.S. Pat. No. 4,018,316 McQuinn et al., and the five-speed transmission shown in U.S. Pat. No. 3,691,872 Schaefer et al., dated Sept. 19, 1972, the invention basically is used in a two-speed transmission, as shown in U.S. Pat. No. 3,587,355 Schaefer, dated June 28, 1971. Thus, for conciseness and clarity, the preferred embodiment of the invention is described in the two-speed transmission 11 shown in FIG. 1.

Figure 1:
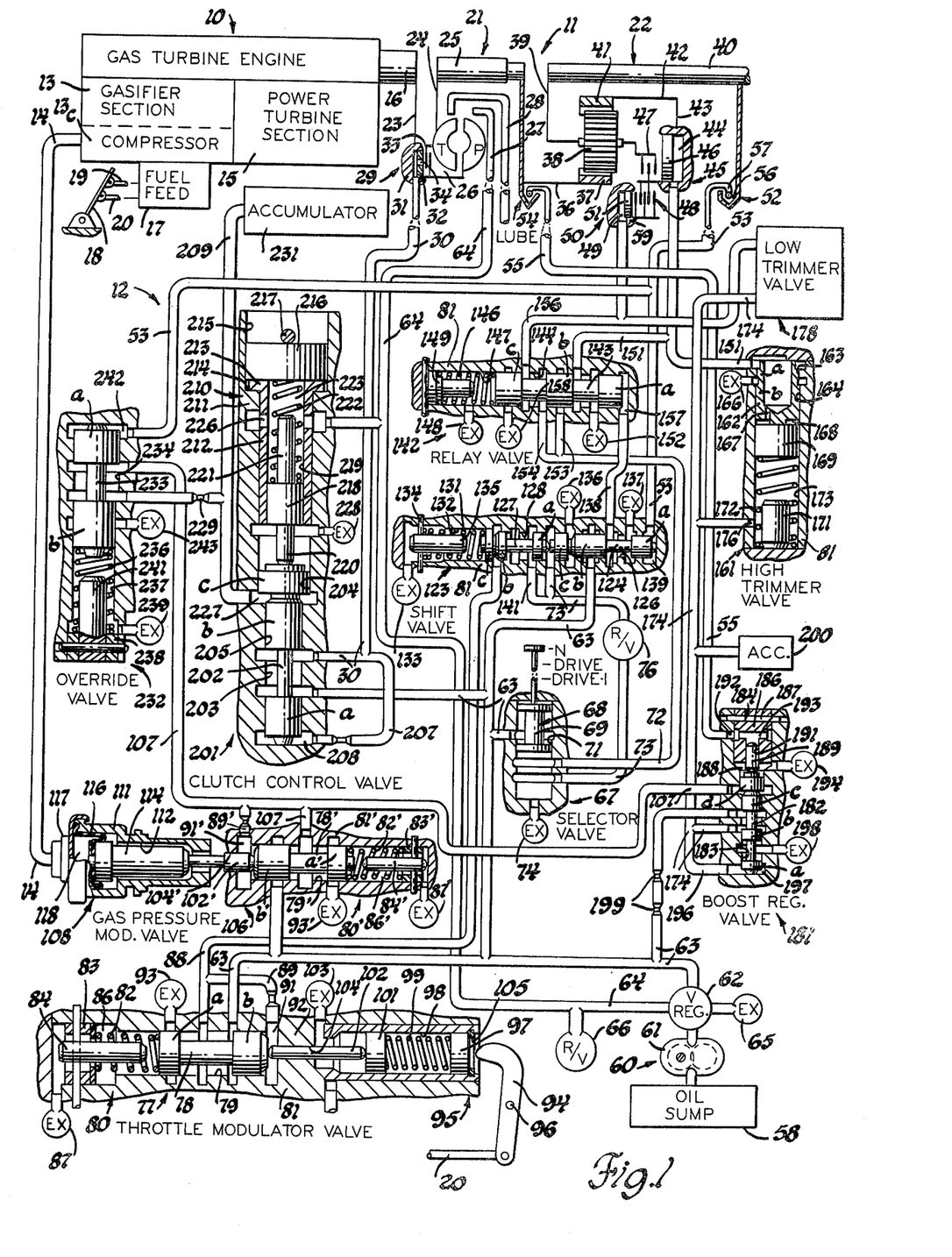
FIG. 1 schematically shows a drive train with an engine and transmission with automatic shift controls.

As shown schematically in FIG. 1, the drive train of the invention includes a conventional gas turbine engine 10, a transmission 11, and transmission controls 12. The known gas turbine engine 10 has a gasifier section 13 having a compressor 13c and burner. Compressor 13c supplies compressor discharge pressure to a compressor discharge pressure line 14 connected to transmission controls 12 and to the burner for delivery of gas to the power turbine of the power turbine section 15 of engine 10. Engine output shaft, which also is the transmission input shaft, is driven by the power turbine through reduction gearing in power turbine section 15. A fuel feed 17 is controlled by a throttle control pedal 18, connected by engine linkage 19, to control the fuel feed 17, in conjunction with the fuel feed automatic controls to control the supply of fuel to the burner in gasifier section 13. Throttle pedal 18 also is connected to transmission controls 12 by transmission linkage 20.

Movement of throttle pedal 18 from idle position to full-throttle position for increasing torque demand provides, through engine linkage 19 and fuel feed 17, increasing fuel feed for increasing engine torque from idle to a maximum, and through transmission linkage 20, a first or concurrent torque demand signal varying from a minimum (or zero) to a maximum with throttle pedal movement without significant time lag, and thus is a concurrent torque demand signal. Since the engine 10 requires a significant time period to increase torque from idle torque to maximum torque (e.g., 2 to 4 secs.) in response to throttle pedal movement from idle position to full-throttle position, compressor discharge pressure, which is essentially concurrent with actual engine torque, is used as a second or "lagging" torque demand signal. These first and second torque demand signals are used in the transmission controls 12 described below.

Transmission 11 has a fluid drive or coupling 21 and a gear unit 22 in transmission housing 59. Transmission input shaft 16 is drive connected to a rotary housing 23 which has a bladed pump P. Bladed turbine T is drive connected by a hub 24 to an intermediate or coupling output shaft 25. Pump P and turbine T form a torus operating chamber 26. Fluid is supplied by fluid drive inlet line 27 to fill operating chamber 26 and to provide coolant flow to fluid drive outlet line 28 which is connected to the transmission lubrication system [LUBE], having a cooler and a relief valve (not shown). When pump P is driven by input shaft 16 and rotary housing 23, fluid in operating chamber 26 is circulated in a toroidal flow path to hydrokinetically drive turbine T and coupling output or intermediate shaft 25. When the conventional lockup clutch 29, mounted in rotary housing 23, is supplied with lockup clutch apply pressure by lockup clutch apply line 30 to lockup clutch motor 31, clutch 29 drive-connects rotary housing 23 by hub 24 to intermediate shaft 25. Transmission fluid drive 21 and lockup clutch 29 preferably are a fluid coupling and multiplate starting and lockup clutch as shown in the above U.S. Pat. No. 4,018,316 McQuinn et al., where the fluid drive is used for engine speed control at idle and lockup clutch 29 is used as a main starting slipping clutch for starting drive and then locks up for continued drive. Lockup clutch 29 has a fluid motor 31 having a piston 32 for engaging the clutch plates 33. Piston 32 also has a restricted bleed hole 34 therein which functions as an exhaust for the clutch control valve 201, hereinafter more fully described.

In the gear unit 22 of transmission 11, intermediate shaft 25 drives the input drum 36 and ring gear 37 which meshes with the planetary pinions 38 rotatably mounted on the carrier 39 which drives the output shaft 40. Pinions 38 mesh with the control sun gear 41 which is drive connected to a sleeve shaft 42 and annular drum 43 which has a cylinder 44. When pressure fluid is supplied by high drive line 151 to cylinder 44 of high motor 45, the piston 46 therein moves to engage the high or direct drive clutch 47 to connect carrier 39 via drum 43 and sleeve shaft 42 to sun gear 41 to lock up gear unit 22 for a 1:1 or high ratio drive. Sun gear 41 also is connected by sleeve shaft 42 and drum 43 to the rotary plates of the low brake 48. When pressure fluid is supplied by low drive line 156 to cylinder 49 fixed on transmission housing 59 to move the piston 51 of low motor 50 to engage brake 48, sun gear 41 is held to provide a reduction or low-speed ratio drive. Direct drive clutch 47 and brake 48 are preferably of known multiplate type and have known retraction springs (not shown).

An output speed-responsive governor 52 provides an output governor signal pressure proportional to the speed of output shaft 40 in the output governor signal line 53. An input speed-responsive governor 54 provides an input governor signal pressure proportional to the speed of intermediate shaft 25 in the input governor signal line 55. Both the output and input governors 52 and 54 are illustrated as known pitot tube-type governors and, referring to the reference numerals on output governor 52, have an annular can or trough 56 mounted on and for rotation respectively with output shaft 40 and intermediate shaft 25. Fluid from the lubrication system [LUBE] is supplied by lubrication lines (not shown) to fill troughs 56. Rotation of the annular can or trough with the shaft on which it is mounted causes the body of fluid therein to impinge on the end of the pitot tube 57 fixed on transmission housing 59 and provides the governor signal pressure in the governor signal pressure lines. Other types of speed-responsive governors may be used to provide these governor signals varying with speed.

CONTROLS

Source

In the automatic control system 12, exhausted fluid (oil) from the control system and lubrication system (LUBE, FIG. 1) returns to the sump 58 in the base of transmission housing 59. A known fluid pressure source 60 supplies fluid pressure to the transmission 11 and controls 12. Gasifier driven pump 61, or another fluid pressure source, e.g., an electrically driven pump, delivers the fluid from sump 58 under pressure to the main regulator valve 62 which regulates the pressure of fluid in the mainline 63 at a high pressure value and connects the first fluid flow overage to the fluid drive supply line 64 connected to fluid drive inlet line 27, and the second fluid flow overage to the exhaust 65. One example of this type fluid supply is shown in the above U.S. Pat. No. 4,018,316 McQuinn et al. Fluid drive supply line 64 may have a relief valve 66 to limit fluid drive supply pressure. Mainline 63 is directly connected to selector valve 67, shift valve 123, gas pressure or second torque demand modulator valve 106, throttle or first torque demand modulator valve 77, clutch control valve 201, and boost regulator valve 181. These valves are thus supplied with mainline pressure and function whenever the pump 61 is driven by the engine 10 or by vehicle overrun.

Selector Valve

The selector valve 67 has a valve element 68, having a recess 69 between two equal-diameter lands, and is mounted for reciprocal movement in a bore 71. In the Neutral position (N) shown in FIG. 1, mainline 63 is blocked and the drive line 72 and the drive-1 line 73 are connected to exhaust 74. When valve element 68 is moved to the Drive position (DRIVE), mainline 63 is unblocked and is connected to drive line 72, and drive-1 line 73 remains connected to exhaust 74. In the DRIVE 1 position, mainline 63 is connected to drive line 72 and drive-1 line 73. Drive-1 line 73 may have a downstream regulator valve 76 regulating drive-1 pressure at a lower value (e.g., 30 psi) than mainline pressure value (e.g., 100 to 150 psi). Downstream regulator valve 76 will not affect the mainline pressure upstream of this valve.

Throttle Modulator Valve

The inverted throttle modulator valve 77 has a regulator valve portion 80 and spring actuator 95 and provides a modulator or first torque demand signal pressure inversely proportional to the first torque demand signal provided by transmission linkage 20. Throttle modulator valve 77 has, in regulator valve portion 80, a valve element 78 having equal-diameter lands 78a and b located in a bore 79 in the valve body 81. Valve element 78 is biased in a pressure increasing direction by a biasing spring 82 which seats against a spring seat 83 having a stop pin 84 which may be adjustable, as shown and described in the above U.S. Pat. No. 3,587,355 Schaefer. Spring 82 is located in spring chamber 86 vented by exhaust 87 and engages land 78a to bias valve element 78 in a pressure increasing direction. The first torque demand line 88 is connected to bore 79 between lands 78a and b and has a restricted branchline 89 connected to a pressure chamber 91 at the closed end of bore 79 adjacent wall 92. First torque demand pressure in chamber 91 provides a pressure decreasing bias force on land 78b to bias valve element 78 from the pressure increasing position shown, where mainline 63 is connected between lands 78a and b to first torque demand line 88 and land 78a blocks exhaust, to the pressure decreasing position where land 78b blocks mainline 63 and connects first torque demand line 88 to exhaust 93.

Spring actuator 95 of throttle modulator valve 77 is controlled by throttle pedal 18 through transmission linkage 20. When throttle pedal 18 is moved from idle to full-throttle, it provides a concurrent torque demand signal varying from zero to maximum torque demand. In addition to throttle pedal 18, other concurrent torque demand control devices may be used, e.g., a diesel fuel feed rack, a fuel feed control actuated by an engine speed governor, or a speed control of a fuel feed governor. Throttle pedal 18 is connected by transmission linkage 20 to the lever 94 of spring actuator 95. Lever 94 is pivoted by a pivot pin 96 and engages a plug 97 slidable in a bore 98 to compress a spring 99 and to act through a slidable plug 101 on a thrust pin 102. Bore 98 is vented by exhaust 103, and plugs 97 and 101 have fluid clearance in bore 98, or apertures, for free movement of the plugs without fluid entrapment. Plug 101 acts on thrust pin 102, slidably sealed in a bore 104 in wall 92, to transmit force to modulator valve element 78. Stop ring 105, fixed in bore 98, limits movement of plug 97 in idle position spaced from actuator lever 94 to provide clearance or slack.

In idle position with plug 97 abutting stop ring 105, actuator spring 99 exerts a small minimal bias force through plug 101 and thrust pin 102, so there is no slack between these valve parts, to act on valve element 78. Thus in idle position the large bias force of biasing spring 82, reduced by the small minimal bias force of actuator spring 99, is opposed by the first concurrent torque demand pressure in pressure chamber 91 acting on land 78b to regulate first concurrent torque demand signal pressure in line 88 at the maximum value. As throttle pedal 18 is moved from idle position to full-throttle position after the slack is taken up, spring actuator lever 94 has a similar movement, compressing actuator spring 99 to provide a concurrent torque demand force on thrust pin 102 increasing from a minimum (or zero) to a maximum. This concurrent torque demand force acts on valve element 78 through thrust pin 102, so throttle modulator valve 77, which is an inverting regulator valve, provide a first concurrent torque demand pressure decreasing from a maximum to a minimum (or zero). As pointed out in the above U.S. Pat. No. 3,587,355 Schaefer, this torque demand signal pressure has constant maximum and zero values respectively in a very short range of throttle pedal movement away from idle position and approaching full-throttle position for improved accuracy. During this short range of throttle pedal movement from idle position, only the clearance between plug 97 and actuator lever 94 in idle position is taken up, and the bias force of spring 82 only balances the fluid pressure force on thrust pin 102. Thus, only the area of land 78b, biasing spring 82, and actuator 95 with the actuator spring 99 and plug 97 engaging or abutting stop ring 105, accurately determine maximum torque demand pressure unaffected by tolerance variation in transmission linkage 20. Just before throttle pedal 18 reaches full-throttle position, the force of actuator spring 99 balances the force of biasing spring 82, so minimum torque demand pressure at full-throttle is "zero", without tolerance variation.

Gas Pressure Modulator Valve

The gas pressure, or second torque demand pressure modulator valve 106 provides a second torque demand pressure signal in second torque demand signal line 107 inversely proportional to compressor discharge gas pressure supplied by compressor discharge pressure line 14. Gas pressure modulator valve 106 has a regulator valve portion 80' and a gas actuator 108. Although the gas pressure modulator valve 106 is reversed end-for-end relative to the throttle modulator valve 77 for simplification of the drawing layout, it will be seen that their regulator valve portions 80' and 80 are the same, so like reference numerals (primed) have been used and reference is made to the above description of throttle modulator valve 77. Regulator valve portion 80' has a valve element 78' biased in a pressure increasing direction by biasing spring 82' and biased in an opposite pressure decreasing direction by thrust pin 102' and second torque demand signal pressure supplied from the second torque demand signal line 107 through restricted branchline 89' to pressure chamber 91'. Second torque demand signal line 107 always is connected to the space between lands a' and b' of valve element 78'. When valve element 78' is moved in a pressure increasing direction, mainline 63 is connected to second torque demand line 107 and exhaust 93' is closed to increase second torque demand signal pressure in line 107. When valve element 78' is moved in a pressure decreasing direction, mainline 63 is closed and second torque demand line 107 is connected to open exhaust 93' to reduce second torque demand signal pressure in line 107.

The gas actuator 108 has a body 111 mounted on the transmission housing 59. Gas actuator body 111 has a bore 112 to guide piston 114. There is sufficient clearance or other provision so that piston 114 is not sealed in bore 112. The seal between piston 114 and body 111 is provided by a roll diaphragm 116 which is centrally secured to the end of piston 114 and peripherally sealed and clamped between cover 117 and body 111 which are secured together. Compressor discharge pressure line 14 is connected through cover 117 to the gas chamber 118 to act on roll diaphragm 116 to provide a compressor discharge pressure signal force which is transmitted by piston 114 and thrust pin 102' to valve element 78' of gas pressure modulator valve 106 to regulate the second torque demand signal pressure in line 107. This second torque demand signal pressure is "lagging" with respect to actual torque demand and substantially concurrent with actual engine torque delivered to the transmission 11.

Shift Valve

The shift valve 123 has a shift valve element 124 having lands a, b, and c, located in a stepped bore 126, and a control valve element 127 having lands a, b, and c, in a stepped bore 128. The lands of both valve elements have sequentially increasing diameters from a to c, and bores 126 and 128 in valve body 81 are stepped to fit the lands. Both valve elements are biased to the downshift position by a spring 131 located in a spring chamber 132 vented by exhaust 133. Spring 131 is seated on a seat 134 having a stop pin 135 limiting valve movement. In the low or downshift position shown, shift valve element 124 blocks mainline 63 and connects the shift signal line 138 to exhaust 137. In this position, output governor pressure supplied by output governor signal line 53, acting in governor chamber 139 on land a of shift valve element 124, provides the speed-responsive upshift bias force. The torque demand downshift bias force is provided by the downshift direction spring force provided by spring 131, as reduced by the concurrent torque demand force acting in an upshift direction provided by the first torque demand signal pressure supplied by line 88 acting on the differential area of control valve element 127 land c (the area of land 127c minus the area of land b). When governor and modulator pressures overcome the spring force, or when the speed-responsive governor pressure bias force overcomes the opposing net torque demand bias force (spring force minus torque demand signal pressure force), the valve elements 124 and 127 upshift at an automatic upshift speed. In upshift position, land a of valve element 124 blocks exhaust 137, and mainline 63 is connected to shift signal line 138. The mainline pressure between lands 124a and b acts on the excess area of land 124b relative to the area of land a, the mainline primary hysteresis area, to provide a primary upshift hysteresis force provided by mainline pressure acting on the primary hysteresis area. In addition, modulator pressure also acts on land 127b in addition to acting on land 127c of control valve element 127 to provide a larger differential area (area of land 127c minus area of land a) and a torque demand upshift hysteresis force causing downshift at lower speeds. The sum of the primary upshift hysteresis force and the torque demand upshift hysteresis force is the total upshift hysteresis force. Exhaust 136 vents valve bore 126 between the downshift drive-1 line 73 and mainline 63 and thus vents the step between lands 124b and c of shift valve element 124 in all positions. Hold-downshift or drive 1 pressure in drive-1 line 73 and its branchline 141 is connected between the valve elements when in the downshift and upshift positions, respectively, to position valve element 124 in a downshift position at proper speeds higher than the automatic upshift speed. Shift valve 123 and relay shift valve 142 are known, as in the above U.S. Pat. Nos. 3,587,355 and 3,691,872.

Relay Shift Valve

The relay shift valve 142 has a valve element 143 having equal-diameter lands a, b, and c, located in a bore 144 in valve body 81, and is biased by a spring 146 to the low position shown in FIG. 1. Spring 146 is located in a chamber 147 vented by exhaust 148 and is seated on a seat-and-valve stop assembly 149. When valve element 143 is biased by spring 146 to the low position shown, the high drive line 151 connects high motor 45 of the high drive device, high or direct drive clutch 47, between lands 143a and 143b to exhaust 152, and the drive line 72 is connected by branch 154, between lands 143b and c, and through low drive line 156 to low motor 50 of low drive device or brake 48 to establish low drive. When shift valve 123 upshifts to supply mainline 63 pressure to shift signal line 138 and to chamber 157, the main pressure in chamber 157 acts on land 143a to upshift relay valve element 143 to connect low motor 50 of low drive device or brake 48 by low drive line 156 between lands 143b and c to exhaust 158 to disengage the low drive device or brake 48, and connects drive line 72, via branch 153, between lands 143a and b through high drive line 151, to high motor 45 of high drive device or direct drive clutch 47 to engage high drive.

Trimmer Valves

The high trimmer regulator valve 161 for controlling high ratio engagement has a trimmer regulator element 162 having a small land a and large land b located respectively in small bore 163 and large bore 164. High drive line 151 is connected to the closed end of small bore 163 and acts on land 162a to bias regulator valve element 162 to the open position connecting high drive line 151 to exhaust 166 to reduce the pressure. High drive line 151 also is continuously connected through a restriction 167 in regulator valve element 162 to the space 168 between regulator valve element 162 and an actuator plug 169. A stop member 171 limits movement of plug 169 and compression of the spring 172 located in a closed chamber 173, having trimmer boost pressure line 174 connected thereto at a port 176 below stop member 171, and thus never blocked by plug 169. When high drive line 151 is vented, spring 172 is extended with plug 169 engaging regulator valve element 162, as shown. On the initial supply of fluid to high motor 45 of high or direct drive clutch 47 by high drive line 151, fluid pressure acts on regulator valve element 162 and is regulated at a low pressure value determined by the trimmer boost pressure which increases with increasing delayed torque demand, and increases with increasing input speed, as explained below, and also the minimum spring force at full height in the valve assembly. At the same time fluid flows slowly through restriction 167 in regulator valve element 162 to fill and expand the space 168 and to gradually separate regulator valve element 162 and plug 169 so that spring 172 is more and more compressed to gradually increase the spring force and regulate high drive pressure in high drive line 151 and high motor 45 at a pressure increasing at a rate determined by the size of restriction 167, spring 172 rate, and change of boost pressure until the maximum regulated pressure is provided, when actuator plug 169 engages stop member 171 for gradual engagement of high direct drive clutch 47. Then, with equal pressure on lands 162a and b, regulator valve element 162 is moved by fluid pressure to close exhaust 166, and the pressure in high drive line 151 and high motor 45 rapidly increases to mainline pressure. Regulator valve element 162 will remain in this position until exhaust of high drive line 151 exhausts space 168, so spring 172 returns plug 169 to the initial position shown.

The low trimmer regulator valve 178 is basically similar to high trimmer regulator valve 161, and thus the details are not shown. Low trimmer regulator valve 178 is connected to and similarly regulates low drive pressure in low drive line 156 in response to the supply of low drive pressure and boost pressure supplied by trimmer boost pressure line 174. The use of trimmer regulator valves makes it possible to individually set the low pressure and rate of pressure rise of each drive pressure to meet the requirements of each drive device, high clutch 47 or low brake 48, with the same valve structure and different springs fitting therein.

Boost Regulator Valve

The boost regulator valve 181 has a valve element 182 located in a stepped bore 183 in valve body 81, and is biased by governor actuator 184 to the feed position shown. The space in bore 183 between valve element 182 and governor actuator 184 is vented by exhaust 194. Bore 183 has small, intermediate, and large diameter portions. Valve element 182 has small equal-diameter lands a, b, and c in the small diameter portion of bore 183, and large diameter land d in the intermediate diameter portion of bore 183. Governor actuator 184 has a cylinder member 186 secured and sealed in the large diameter portion of bore 183 by a pin 187 and a stepped shoulder 188 between the large diameter bore portion and intermediate diameter portion of bore 183. A piston member 189 is located in a bore 191 in cylinder member 186. Input governor signal line 55 is connected by a port 192 in valve body 81 and cylinder member 186 to a chamber 193 at the closed end of bore 191, so that input governor pressure acts on piston member 189 to cause the piston member to engage valve element 182 to increase boost regulated pressure proportional to input governor pressure and speed of intermediate shaft 25. With valve element 182 in the feed position shown, mainline 63 is connected between lands 182b and c to the trimmer boost pressure line 174. Line 174 is connected by its branchline 196, which may be restricted, to the closed chamber 197 at the end of bore 183, and acts on the end area of land 182a to oppose input governor pressure bias and regulate the boost pressure. When the boost pressure exceeds the regulated value, it will move valve element 182 to the exhaust position, connecting trimmer boost pressure line 174 between lands 182a and b to exhaust 198.

The second torque demand signal line 107 is connected between lands 182c and d to act on the unbalanced area of land 182d to oppose the input governor pressure bias. Increasing second torque demand signal pressure provides a proportionately reduced trimmer boost pressure. Since second torque demand signal pressure varies inversely with compressor discharge pressure and is a maximum pressure value at idle and decreases to minimum or zero at a high compressor discharge pressure, the trimmer boost pressure is low at idle, or at low torque demand values, and increases in proportion to increasing torque demand. The trimmer boost pressure also increases at a lower rate proportional to input governor pressure and thus the speed of intermediate shaft 25. Since during shifting the lockup clutch 29 is engaged, input governor pressure is proportional to engine output speed during shifting. Movement of throttle control pedal 18 provides substantially without time delay the throttle modulated pressure or first torque demand signal pressure in line 88, a leading torque demand signal having a large lead time relative to actual engine torque. Compressor discharge pressure and gas modulator or second torque demand signal pressure, and thus trimmer boost pressure, vary substantially simultaneously with actual engine torque.

There are two restrictions 199 in the mainline 63 portion feeding boost regulator valve 181 for limiting the volume rate of supply of boost pressure to trimmer regulator valves 161 and 178 and accumulator 200, to cooperate during initial trimmer regulation to reduce the rate of initial pressure rise, as shown in U.S. Pat. No. 4,036,083 McQuinn, dated July 19, 1977.

Clutch Control Valve

The clutch control valve 201 has a valve element 202 having small equal-diameter lands a and b in small portion 203 of bore 205, and a larger diameter land c in large portion 204 of bore 205. With valve element 202 in the full-open position shown, mainline 63 is connected between lands a and b to starting and lockup clutch apply line 30 connected to clutch fluid motor 31, to act on piston 32 (which has the continuous restricted bleed hole 34 as described above), and connected by restricted branch 207 of clutch apply line 30, to supply clutch apply pressure to the biasing chamber 208 at the closed end of small bore portion 203. Clutch apply pressure in chamber 208 biases clutch control valve element 202 in a closing direction, regulating clutch apply pressure by blocking mainline 63. An exhaust at clutch control valve 201 is not required as clutch apply line 30 has a continuous restricted connection to exhaust through restricted bleed hole or restriction 34 in piston 32. The controlled second torque demand signal line 209 is connected at the step between the small and large bore portions 203 and 204 and acts on the unbalanced area of large diameter land 202c (the area of land c minus the area of land b), in a valve closing direction.

The valve opening biasing means 210 has a sleeve member 211 having a sleeve portion 212 fitting and sealed in large bore portion 204, and a shoulder portion 213 seated on a step 214 between large bore portion 204 and a larger closure bore 215. Closure 216 in bore 215 is secured by a pin 217 to seal closure bore 215 and engage shoulder portion 213 to secure sleeve member 211 in large bore portion 204. Valve opening biasing means 210 also has a piston 218 slidable in the bore 219 of sleeve portion 212 and having a thrust portion 220 engaging land 202c and a stop portion 221 to limit pressure increasing movement of valve element 202 and piston 218. Regulator spring 222 is seated on closure 216 in bore 219 and biases piston 218 with an opening or pressure increasing bias force. Stop portion 211 of piston 218 also guides and limits compression of regulator spring 222. The diameter of biasing piston 218 is the same as that of land 202a. Fluid drive supply line 64 is connected to a chamber 223 in bore 219 of sleeve portion 212 between the end closed by closure 216 and biasing piston 218, to act on piston 218 to increase clutch apply pressure. The controlled second torque demand signal line 209 is connected to clutch control valve 201 at the step 227 between large and small bore portions 204 and 203 to act on the unbalanced area of large diameter land 202c. The large bore portion 204, centrally between land 202c and biasing piston 218, is always vented by exhaust 228. The controlled second torque demand signal line 209 is connected through restriction 229 to clutch control valve 201, and to the accumulator 231 so that the change (increase or decrease) of second torque demand pressure force on clutch control valve element 202 and thus of clutch apply pressure will be time-delayed relative to the change of second torque demand signal pressure, e.g., at a lower time rate of change of second torque demand signal pressure.

The accumulator 231 is a known accumulator in which controlled second torque demand pressure moves a piston against a biasing spring to charge the accumulator, and the biasing spring moves the piston to discharge the accumulator. Accumulator 231 is charged with a volume of fluid proportional to second torque demand signal pressure. At idle, second torque demand pressure has a maximum value, charging accumulator 231 to maximum volume. As the throttle pedal 18 is advanced and second torque demand signal pressure decreases, accumulator 231 discharges and restriction 229 both act to time delay the decay or decrease of controlled second torque demand signal pressure in line 209 relative to the decay of second torque demand signal pressure in line 107. Thus controlled second torque demand signal pressure, acting on clutch control valve element 202, delays the increase of clutch apply pressure in line 30 relative to the decrease of second torque demand pressure and increase of engine torque, to extend the slip time of starting and lockup clutch 29 for a smoother engagement—especially the initial vehicle starting engagement in response to throttle increase. Also, on a light-load or coast start where vehicle speed would exceed the starting speed range (0 to 6 MPH) at low throttle, when the override valve 232 shifts, in response to output speed exceeding the starting speed range, to block the connection of second torque demand pressure signal line 107 to controlled second torque demand signal line 209 and connect line 209 to exhaust 243, accumulator 231 and restriction 229 similarly delay the decrease of controlled second torque demand pressure and the increase of clutch apply pressure in line 30 for smoother engagement of starting and lockup clutch 29.

The coupling charging or fluid drive supply pressure supplied by line 64 to chamber 223 and spring 222 act on biasing piston 218 and are opposed by controlled second torque demand signal pressure supplied by line 209 acting on the unbalanced area of land 202c and lockup clutch apply pressure acting on land 202a. Thus at idle throttle position and minimum compressor discharge pressure in line 14, maximum second torque demand pressure (Curve 248, FIG. 5) acting on the differential area of larger land 202c provides a bias force about equal and opposite to the spring bias force of spring 222, so minimum clutch apply pressure in line 30 is about equal to the constant fluid drive supply pressure in line 64. Since fluid drive supply pressure, which functions as clutch release pressure, and clutch apply pressure act on opposite sides of piston 32, the differential clutch apply pressure is about "zero" to fully release lockup clutch 29. The clutch apply pressure can be slightly less or slightly more than clutch release pressure for a small negative or positive differential clutch apply pressure, respectively, for a full clearance release or a contacting release for smooth initial drive engagement. As throttle displacement increases, after a time delay and substantially simultaneous with engine torque increase, the compressor discharge pressure in line 14 increases (Curve 249, FIG. 5) and second torque demand signal pressure in line 107 decreases (Curve 248). Then after a further time delay by both accumulator 231 and restriction 229, controlled second torque demand pressure in line 209 similarly decreases to increase clutch apply pressure in line 30, providing increasing differential clutch apply pressure to gradually apply starting lockup clutch 29 proportional to and in a small time delay period relative to the throttle-controlled actual increase of engine torque, to control the degree of clutch slip on initial engagement in a low starting speed range. Thus in a low throttle range (e.g., 0 or idle to 15%), the differential clutch apply pressure is a constant low value (e.g., 2 psi Δ pressure) in a large middle throttle range (e.g., 15% to 90%), the differential clutch apply pressure gradually and progressively increases to maximum clutch apply pressure at a high throttle displacement or position (e.g., 90%), and in a high throttle range to full-throttle (e.g., 90% to 100%), differential clutch apply pressure is a constant maximum. Increasing differential clutch apply pressure increases lockup clutch 29 torque capacity for slipping drive and then lockup drive when clutch torque capacity meets load torque.

Override Valve

The override valve 232 has a valve element 233 having land a and larger diameter land b, both slidable in a stepped bore 234. A spring 236 in the spring chamber 237 is seated on an abutment 238 and engages land 233b to bias the valve element 233 to the low speed position shown, connecting second torque demand signal line 107 to controlled second torque demand signal line 209. Spring chamber 237 has a vent exhaust 239. Abutment 238 has a valve movement-stop and spring-guide pin 241. Output governor 52 provides a governor pressure signal proportional to output speed in output governor signal line 53 which is connected to a chamber 242 in the closed end of bore 234. Governor pressure acting on land 233a is insufficient at very low vehicle speeds to overcome the net bias force, the bias force of spring 236 minus the hysteresis force of second torque demand pressure acting on the unbalanced area of large diameter land 233b, so spring 236 holds valve element 233 in the low speed position shown, connecting second torque demand signal line 107 to controlled second torque demand signal line 209, to control clutch control valve 201. As the speed of the vehicle and output shaft 40 increase, at a predetermined low vehicle speed (e.g., 6 MPH) output governor pressure overcomes the net bias force of the spring and hysteresis forces and moves valve element 233 to the high speed position connecting controlled second torque demand signal line 209 between lands 233a and b to exhaust 243, and land 233a blocks second torque demand signal line 107. When controlled second torque demand signal line 209 is exhausted, there is no hysteresis force on land 233b. The change of hysteresis force prevents valve oscillation. As vehicle speed increases, override valve 232 closes at a predetermined lower speed due to this hysteresis force to, on a closed throttle vehicle brake stop of the vehicle, retain engine braking to a lower predetermined speed.

Figure 2:
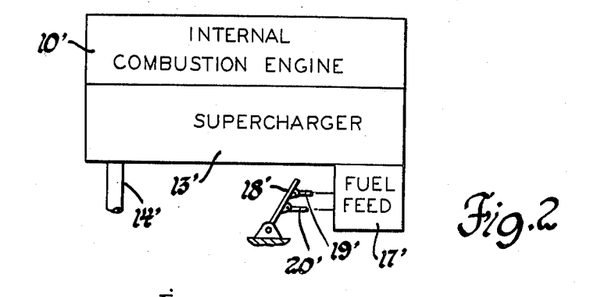
FIG. 2 schematically shows a modified engine for the drive train of FIG. 1.

FIG. 2 Modification

FIG. 2 shows an internal combustion engine 10' which may be used in place of the gas turbine engine 10 with the transmission 11 and controls 12 shown in the drive train of FIG. 1. Components or parts with numerals primed are shown in FIG. 2 for the same-numbered components of FIG. 1 having a similar function, and reference to the description of FIG. 1 is made therefor.

Internal combustion engine 10' has a supercharger 13' which includes a compressor and a drive, especially a turbine drive, to provide a lagging supercharger gas pressure to internal combustion engine 10'. Supercharger gas pressure provides a second torque demand signal pressure in compressor discharge pressure line 14' which "lags" relative to actual torque demand and is substantially simultaneous with actual engine torque, and thus may be used in the transmission controls 12 of FIG. 1 in the same manner as compressor discharge pressure to control gas pressure modulator valve 106. A throttle control pedal 18' is connected by engine linkage 19' to control fuel feed 17' for controlling fuel feed to internal combustion engine 10', and is connected by transmission linkage 20' to spring actuator 95 (FIG. 1) to control throttle modulator valve 77, as described above, to provide a first concurrent torque demand signal pressure.

Operation

When engine 10 is operating transmission 11 fluid pump 61 is driven to supply pressure fluid to mainline 63 at a pressure regulated by main regulator valve 62, with first fluid flow overage connected to fluid drive supply line 64 and second overage connected to exhaust 65. Selector valve 67, in the neutral position (N) shown, connects both drive line 72 and drive-1 line 73 to exhaust 74. When drive line 72 is exhausted, relay valve 142 exhausts both the low drive line 156 and the high drive line 151 to disengage both the low brake 48 and the high clutch 47 for positive neutral in the transmission gear unit 22.

Mainline 63 is directly connected to throttle modulator valve 77, gas pressure modulator valve 106, automatic shift valve 123, boost regulator valve 181, and clutch control valve 201, so these valves function in all positions of the selector valve 67. Throttle modulator valve 77 is actuated by throttle control pedal 18 and transmission linkage 20, which is connected by lever 94 to spring actuator 95, to provide in first torque demand line 88 a throttle modulated or concurrent first torque demand signal pressure (Curve 246, FIG. 4) varying inversely and essentially simultaneously with throttle pedal position (Curve 247). These are instantaneous torque demand signals. The throttle modulator pressure has a maximum pressure value at idle throttle and a minimum (preferably zero) pressure value at full-throttle. Also, it is preferred that first torque demand signal pressure be constant at the maximum pressure value during the first few degrees of throttle pedal movement from idle throttle and at zero pressure during the last few degrees of pedal movement approaching full-throttle so that linkage and valve tolerance variations do not adversely affect operation of the control system, as shown in the above U.S. Pat. No. 3,587,355 Schaefer. Throttle modulator valve 77 provides torque demand means providing a first torque demand signal varying proportionally and substantially simultaneously or at the same time as instantaneous torque demand.

Figure 4:
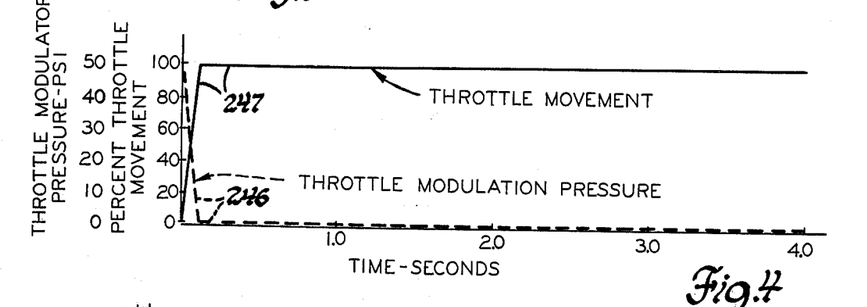
FIG. 4 shows a plot of percent throttle and first torque demand pressure relative to time.
Figure 5:
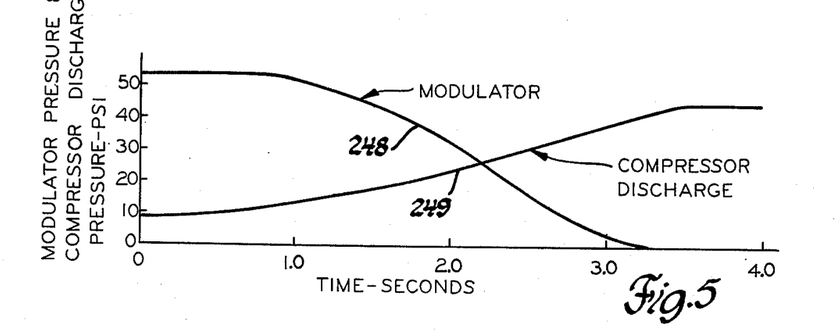
FIG. 5 shows a plot of compressor discharge pressure and second torque demand pressure relative to time.

Gas pressure modulator valve 106 similarly provides gas modulator pressure or second torque demand signal pressure in second torque demand signal line 107. The second torque demand signal pressure (Curve 248, FIG. 5) varies inversely with engine compressor discharge or supercharger pressure (Curve 249) and has a constant maximum pressure value, due to pin 102', near idle minimum compressor or supercharger discharge pressure and decreases inversely relative to increasing such discharge pressure to a minimum pressure value, preferably zero pressure. FIGS. 4 and 5 are plotted on the same time scale, from the same initial (or zero) time. FIG. 4 shows throttle pedal 18 movement (Curve 247) increasing at a high rate, a fast throttle pedal advance or increase from idle (0%) position to full-throttle (100%) position in 0.1 second, and the essentially simultaneous variation of the inverted first torque demand signal pressure (Curve 246). In response to this fast throttle pedal advance, increased fuel feed and compressor 13c (FIG. 1) or supercharger 13' (FIG. 2) speed, will increase compressor or supercharger discharge pressure (Curve 249, FIG. 5) in a delayed time relation to throttle pedal advance, and provide substantially simultaneously the inverted second torque demand signal pressure (Curve 248). Compressor or supercharger discharge pressure provides a torque demand signal that is substantially simultaneous with actual engine torque. Thus the gas pressure modulator valve 106 provides actual torque demand signal means providing an actual or second torque demand signal which, in response to a change of manual or automatic torque demand, occurs a time-lag period after the time of the change of the manual or automatic torque demand signal. During the time-lag period the engine 10 can change actual torque in response to the change of torque demand.

The automatic shift valve 123, in the downshift position shown, blocks mainline 63 and exhausts shift signal line 138 so relay valve 142 is in the downshift position shown. This is the normal position of these valves at the low speeds normally encountered in neutral. Output governor 52 and throttle modulator valve 77 are operating, so automatic shift valve 123 will function as described below with respect to automatic operation in DRIVE if high speed coasting occurs in neutral, but gear unit 22 will remain in positive neutral since drive line 72 is exhausted at selector valve 67.

The boost regulator valve 181 is supplied by mainline 63, second torque demand signal pressure line 107, and input governor signal pressure line 55, and functions to supply trimmer boost pressure line 174. When the engine is idling at idle speed and providing the idle or minimum compressor discharge pressure so gas pressure modulator valve 106 supplies maximum second torque demand signal pressure (e.g., 55 psi) in line 107, and idle speed of intermediate shaft 25 provides minimum input governor pressure (e.g., zero) in line 55, the normal neutral condition, the trimmer boost pressure in line 174 has a low value, e.g., zero. The trimmer boost pressure increases with increasing input governor pressure or increasing speed of intermediate shaft 25 and increases with decreasing second torque demand pressure or increasing engine torque. Thus boost pressure increases with engine power.

In all positions of selector valve 67, neutral (N), drive (DRIVE), drive 1 (DRIVE 1), when the vehicle is standing or moving at low speeds (e.g., 0 to 6 MPH), the override valve 232 is open, as shown, so second torque demand signal line 107 is connected to controlled second or a third torque demand signal line 209 to control clutch control valve 201. Clutch control valve 201 is supplied by mainline 63 and controlled by fluid drive supply pressure supplied by fluid drive supply line 64 and second torque demand signal pressure supplied by controlled second torque demand signal line 209 to regulate lockup clutch apply pressure supplied by clutch apply line 30 to clutch fluid motor 31. At idle throttle, maximum second torque demand signal pressure provides clutch apply pressure at a pressure value about equal to the constant pressure value of the fluid drive supply pressure, so there is no differential pressure acting on piston 32 of clutch fluid motor 31 to engage the starting and lockup clutch 29. Thus at idle throttle providing minimum idle compressor discharge pressure at minimum engine torque, the starting and lockup clutch 29 is disengaged. While there is no engaging differential clutch apply pressure, there may be a very small contacting differential clutch pressure to provide clutch plate contact without significant torque transmittal. Increasing throttle pedal position (Curve 247, FIG. 4), after a time delay, increases compressor discharge pressure (Curve 249) and decreases second torque demand signal pressure (Curve 248) substantially concurrently with increasing engine torque. The decreasing controlled second or third torque demand signal pressure, due to restriction 229 and accumulator 231, lags by a very short time period relative to the decreasing second torque demand signal and acts on clutch control valve 201 to increase clutch apply pressure and thus the increase of differential clutch apply pressure is in proportion to and slightly lags or has a time delay relative to increasing engine torque for controlled slip.

Drive Operation

When selector valve 67 is manually shifted from neutral (N) position to drive (DRIVE) position, mainline pressure, in addition to the direct connections provided in neutral, also is connected by drive line 72 to relay valve 142. Normally this manual shift is made with the engine idling and the vehicle stationary, so lockup clutch 29 is disengaged and both the automatic shift valve 123 and relay valve 142 are in the downshift position shown. The downshifted relay valve 142 connects drive line 72 to low drive line 156 to engage low brake 48 to establish the low ratio forward drive to stop intermediate shaft 25 and stall fluid drive 21 to regulate engine idle speed at a high idle speed value. Low trimmer regulator valve 176, in response to the low or minimum boost pressure (e.g., zero) in line 174 supplied by boost regulator valve 181 at engine idle speed and minimum or idle speed compressor discharge pressure, regulates low drive pressure in low drive line 156, in response to its orifice and spring, at low pressure values increasing at a basic low rate for smooth low-power engagement at an intermediate pressure value, and then provides mainline pressure for subsequent full-power drive. Then, as throttle control pedal 18 is advanced providing an increased torque demand signal and decreasing first torque demand signal pressure, the fuel feed 17 supplies increased fuel to the engine 10 to increase engine torque and compressor discharge (or supercharger) pressure substantially concurrently with increasing actual engine torque. The increasing compressor discharge pressure provides decreasing second torque demand signal pressure which provides the controlled second torque demand signal pressure to control the clutch control valve 201 to increase clutch apply pressure and differential clutch apply pressure to smoothly apply lockup clutch 29 with a force proportional to and near concurrent, or preferably slightly lagging with respect to, actual engine torque to drive the load or vehicle in low or 1st drive. The controlled second torque demand signal in line 209 which controls clutch control valve 201 preferably has a small time delay relative to the second torque demand signal, so the clutch apply pressure in line 30 and apply force on starting and lockup clutch 29, while changing in proportion to actual engine torque, has a small time delay during change relative to actual engine torque. The controlled second torque demand signal line 209 has a restriction 229 with downstream connections to the accumulator 231 and step 227 of clutch control valve 201 providing a time delay device to provide this time delay. This time delay provides a controlled small degree of slip during clutch engagement for smooth clutch engagement and a gradual decay of clutch apply pressure during a short time period for smooth clutch disengagement.

Figure 3:
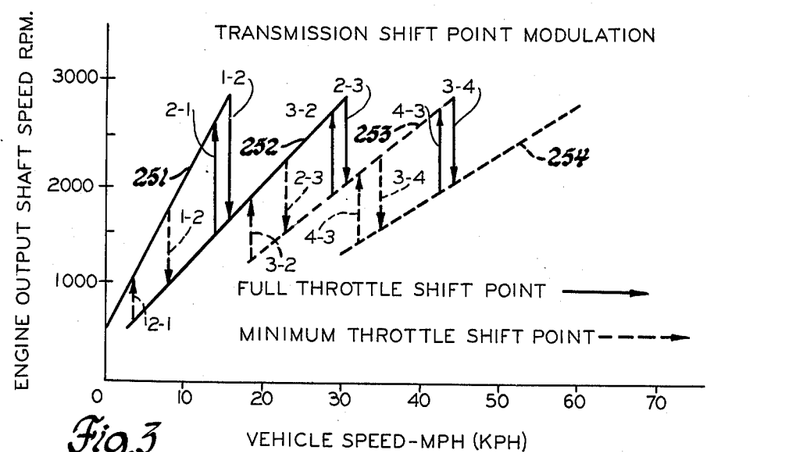
FIG. 3 shows engine speed curves plotted relative to vehicle speed during shifting to show shift point modulation.

In low or 1st drive and high or 2nd drive, engine output shaft 16 speed and vehicle speed vary respectively on 1st and 2nd drive curves (Curves 251 and 252, FIG. 3), having a slope indicating the ratio of the drive. Similar 3rd and 4th drive curves (Curves 253 and 254) are also shown to demonstrate that the invention similarly applies to all drives in transmissions having more than two drives. The shift valve 123, controlled by output governor 52 pressure in line 53 and first torque demand signal pressure in line 88 during full-throttle operation in 1st drive provides, at the upshift point at maximum engine drive speed, in response to output speed, an upshift (solid line arrow 1-2, FIG. 3), at constant vehicle speed to the lower engine speed upshift point in 2nd drive. When operating in 2nd drive at a small reduction of engine speed and output shaft 16 speed for hysteresis, the shift valve 123 provides in response to a small reduction of output shaft speed at the downshift point, a downshift (solid line arrow 2-1) to 1st drive. As throttle is decreased, the shifts occur at lower engine and vehicle speed shift points, and the added hysteresis provided by the first torque demand signal pressure increases the speed difference between upshift and downshift points with decreasing torque demand, as shown by dotted line upshift arrow 1-2 and dotted line downshift arrow 2-1 (FIG. 3). Similar arrows demonstrate the similar shifts between 2nd, 3rd, and 4th drives. These 1-2 and 2-1 shifts by shift valve 123 occur in response to change of vehicle speed resulting in a change of output governor 52 pressure in line 53 and to change of position of throttle control pedal 18 and resulting concurrent change by throttle modulator valve 77 of the first torque demand signal pressure in line 88. These shifts, occurring in response to a change of torque demand, such as a change of position of throttle control pedal 18, occur substantially concurrently with the change of torque demand to a value effecting the shift. When the change of throttle control pedal 18 position, manual torque demand, occurs at a high rate (maximum rate Curve 247, FIG. 4), there is a time lag before the increased fuel feed increases engine torque and compressor or supercharger discharge pressure, which provides a second torque demand signal (Curve 248, FIG. 5) substantially concurrently with engine torque. Throttle control pedal 18 position (Curve 247) controls throttle modulator valve 77 to provide the first torque demand signal pressure (Curve 246) concurrently with throttle control pedal 18 position or other leading torque demand signal provided by engine 10, 10'. Compressor or supercharger discharge pressure (Curve 249) controls gas pressure modulator valve 106 to provide the second torque demand pressure (Curve 248) which has a time lag (FIG. 5) relative to first torque demand pressure (Curve 246) and is substantially concurrent with engine torque.

The second torque demand signal pressure in line 107 and the input governor 54 pressure in input governor signal line 55 act on the boost regulator valve 181 to regulate trimmer boost pressure in line 174 at increasing values proportional to increasing shaft 25 or engine output or transmission input shaft 16 speed and increasing engine torque so the boost pressure is directly proportional to, and concurrent with, engine power delivered to the transmission input. Since automatic shifting occurs after the starting and lockup clutch 29 is locked up, intermediate shaft 25 and engine output shaft 16 have the same speed. Thus at full-throttle and minimum second torque demand signal pressure (e.g., zero), the trimmer boost pressure increases from a very low pressure to maximum pressure (e.g., 25 psi) in proportion to engine speed and input governor 54 pressure increasing from idle to maximum. With decreasing throttle in response to increasing second torque demand signal pressure in line 107, trimmer boost pressure is a minimum (e.g., zero) up to proportionally higher engine speeds, and then increases in the same proportion to increasing engine speed or input governor pressure at proportionally lower values to proportionally lower maximum values. For example: At one-half throttle, trimmer boost pressure is zero up to about 2000 RPM engine speed and then increases to about one-half (e.g., 12.5 psi), the maximum pressure at maximum engine speed. At idle throttle and maximum second torque demand signal pressure, trimmer boost pressure is minimum or zero at all engine speeds, idle to maximum. Conversely, as throttle is increased, trimmer boost pressure increases with engine speed in an increasing engine speed range which is a small high engine speed range at low throttle and the full engine speed range at full throttle.

Trimmer boost pressure line 174 is connected to high and low trimmer regulator valves 161 and 178, so these valves regulate high and low drive apply pressures in high and low drive lines 151 and 156, respectively, during engagement of high clutch 47 and low brake 48 at pressure values in proportion to the concurrent engine torque and speed or power. During the short shift time period (e.g., 0.5 to 1.0 sec.), the change of engine torque, compressor discharge pressure, and second torque demand signal pressure in line 107 is not significant, or is substantially zero. During this shift change engagement period, the speed of the engine output shaft 16 and intermediate shaft 25 will change, decrease on upshift and increase on downshift, as shown in FIG. 3. Thus input governor pressure in line 55 will be decreased by an upshift ratio change and increased by a downshift ratio change. Thus at engine speeds and throttle positions providing the above minimum or zero trimmer boost pressure, the trimmer boost pressure and the drive apply pressure are proportional to speed and power changes during a shift. During the shift change, as shown in trimmer valve 161, fluid flow through the orifice 167 moves plug 169 and increases the bias force of spring 172 as a function of time, so trimmer valves 161 and 178 respectively increase high and low drive apply pressure at a low rate. The net rate of increase of high drive pressure during an upshift is lower than the net rate of increase of low drive pressure during a downshift due to the change of boost pressure in response to engine speed change during a shift. When the torque demand or throttle control pedal 18 position is quickly changed to call for a change of engine power and quickly (substantially concurrently) effects a shift in gear unit 22 before the engine power changes, the drive devices 47 and 48 are engaged with a drive apply pressure proportional to actual engine power at the time of the shift. On an upshift, which shift valve 123 will provide at full-throttle at or near maximum engine speed (e.g., 2400 RPM), the maximum trim boost pressure will control high trimmer regulator valve 161 to provide a high initial high clutch apply pressure in high drive line 151. During high clutch engagement, engine speed is reduced (e.g., 1800 RPM), so boost regulator valve 181 reduces trimmer boost pressure in line 174 to control high trimmer regulator valve 161 to reduce high clutch apply pressure at a net rate proportional to decreasing enging speed and the basic low rate of pressure increase of the trimmer valve. When engagement is completed at the instantaneous torque level to terminate slip, the decrease of engine speed, boost pressure, and high clutch apply pressure is ended and remains constant. The high trimmer valve 161 increases high clutch apply pressure at the basic low rate, due to restriction 167, chamber 168 and spring 172, at the lower level determined by the reduced trimmer boost pressure to ensure continued nonslip engagement. Then at the end of the trimming cycle, trimmer valve 161 closes to increase high clutch apply pressure to mainline pressure. On an upshift at lower throttle positions, the trimmer boost pressure is lower, as pointed out above, so the high clutch apply pressure is initially lower and similarly decreases with decreasing engine speed. When engine speed ceases to decrease, the high trimmer valve 161 increases high clutch apply pressure at the same basic low rate at a lower level. Thus on an upshift, the drive apply pressure has a higher initial value and then decreasing pressure values relative to the initial pressure value proportional to torque demand for initial nonslip engagement and then the constant basic pressure increase rate to ensure continued engagement.

This control system provides, while operating in high drive at low throttle, on a rapid advance of the throttle control pedal 18, a concurrent change of the first torque demand signal effecting a high to low or 2-1 downshift before engine torque and power are increased, with smooth engagement of low drive at a low trimmer boost regulated pressure proportional to the second torque demand pressure and engine speed, and thus proportional to actual engine torque and speed or power at the time of the shift. On this downshift at full-throttle which occurs at a lower speed (e.g., 1600 RPM), the trimmer boost pressure has a low value so low trimmer regulator valve 178 regulates low brake apply pressure in low drive line 156 at an initial low value just above the basic initial trimmer pressure determined by the spring, like spring 172, and the area of the land, like land 162a. During engagement, engine speed increases at an increasing rate to a maximum speed (e.g., 2400 RPM), and trimmer boost pressure is proportionally increased and controls the low trimmer regulator valve 178 to increase low brake pressure at an increasing rate, which is the sum of the effects due to the increasing trimmer boost pressure and the low basic rate of pressure increase of the low trimmer regulator valve 178. After initial engagement, low brake apply pressure is increased at the low basic rate to the end of the shift cycle when low brake apply pressure is increased to mainline pressure. Thus on a downshift there is provided a lower initial drive apply pressure and an initially higher rate of pressure increase relative to an initial pressure proportional to speed and the constant basic pressure increase rate at levels determined by speed and engine torque. The drive apply pressure on a shift is initially higher on an upshift than on a downshift. Then during engagement and engine speed change, the drive apply pressure decreases on an upshift and increases on a downshift. Then drive apply pressure is further increased at a low basic rate during both upshifts and downshifts. This drive apply pressure control during shifts provides good quality shifts.

It will be apparent that other modifications of the invention may be made.

The embodiments of the invention in which an exclusive property or privilege is claimed are defined as follows:

1. In a transmission: Multiratio gear means having an input, an output, and fluid operated means for establishing low and high drives between said input and output; a source of fluid under pressure; governor means providing a governor signal proportional to transmission speed; first torque demand means providing a first torque demand signal proportional to torque demand and substantially simultaneous relative to instantaneous torque demand during a change of torque demand; second torque demand means providing a second torque demand signal proportional to torque demand after a time delay relative to instantaneous torque demand during a change of torque demand; shift valve means operatively connected to said source, said fluid operated means, said governor means and said first torque demand means operative in low position to connect said source of fluid pressure to said fluid operated means to establish said low drive, and in a high position to connect said source of fluid pressure to said fluid operated means to establish said high drive, operative to upshift from low position to high position in response to said governor signal and said first torque demand signal at predetermined speeds increasing with increasing torque demand of said first torque demand signal; boost regulator valve means connected to said fluid pressure source and to said second torque demand means operative to provide a regulated trim boost pressure concurrent with and proportional to said second torque demand signal; and trimmer valve means connected to said shift valve means, said fluid operated means and said boost regulator valve means operative to control the forces of engagement of said fluid operated means in said low and said high drives concurrent with and in proportion to said trim boost pressure so that the forces of engagement are concurrent with and proportional to said second torque demand signal.

2. In a transmission: multiratio gear means having an input, an output, and fluid operated means for establishing low and high drives between said input and output; a source of fluid under pressure; governor means providing a governor signal proportional to output speed; first torque demand means providing a first torque demand signal proportional to and concurrent with torque demand; second torque demand means providing a second torque demand signal proportional to and substantially concurrent with actual input torque; shift valve means operatively connected to said source, said fluid operated means, said governor means and said first torque demand means operative in low position to connect said source of fluid pressure to said fluid operated means to establish said low drive, and in a high position to connect said source of fluid pressure to said fluid operated means to establish said high drive, operative to upshift from low position to high position in response to said governor signal and said first torque demand signal at predetermined speeds increasing with increasing torque demand of said first torque demand signal; boost regulator valve means connected to said fluid pressure source and to said second torque demand means operative to provide a regulated trim boost pressure concurrent with and proportional to said second torque demand signal; and trimmer valve means connected to said shift valve means, said fluid operated means and said boost regulator valve means operative to control the forces of engagement of said fluid operated means in said low and said high drives concurrent with and in proportion to said trim boost pressure so that the forces of engagement are concurrent with and proportional to said second torque demand signal.

3. In a transmission: multiratio gear means having an input, an output, and fluid operated means for establishing low and high drives between said input and output; a source of fluid under pressure; governor means providing a governor signal proportional to output speed; first torque demand means providing a first torque demand signal proportional to and concurrent with fuel feed for an engine; second torque demand means providing a second torque demand signal proportional to and concurrent with the change of above atmospheric gas pressure supplied for an engine; shift valve means operatively connected to said source, said fluid operated means, said governor means and said first torque demand means operative in low position to connect said source of fluid pressure to said fluid operated means to establish said low drive, and in a high position to connect said source of fluid pressure to said fluid operated means to establish said high drive, operative to upshift from said low position to said high position in response to said governor signal and said first torque demand signal at predetermined speeds increasing with increasing torque demand of said first torque demand signal; boost regulator valve means connected to said fluid pressure source and to said second torque demand means operative to provide a regulated trim boost pressure concurrent with and proportional to said second torque demand signal; and trimmer valve means connected to said shift valve means, said fluid operated means and said boost regulator valve means operative to control the forces of engagement of said fluid operated means in said low and said high drives concurrent with and in proportion to said trim boost pressure so that the forces of engagement are concurrent with and proportional to said second torque demand signal.

4. The invention defined in claim 3, further including input governor means providing an input governor signal proportional to the speed of said input, and means connecting said input governor means to said boost regulator valve means operative in response to said input governor signal to increase said trim boost pressure in proportion to input speed so that the force of engagement of said fluid operated means in said low and said high drives is also proportional to input speed.

5. The invention defined in claim 3, and said second torque demand means providing a second torque demand signal concurrently proportional to compressor discharge gas pressure of a gas turbine engine.

6. The invention defined in claim 3, and said second torque demand means providing a second torque demand signal concurrently proportional to supercharger gas pressure of a supercharged internal combustion engine.

7. The invention defined in claim 3, further including a source of clutch apply pressure, a main clutch for establishing drive between said input and output and having a fluid actuator providing main clutch capacity proportional to clutch apply pressure, a clutch control valve, and means connecting said clutch control valve to said source of clutch apply pressure and to said main clutch and to said second torque demand means, said clutch control valve being operative to increase said clutch apply pressure with and proportional to said second torque demand signal to increase said main clutch capacity with increasing engine torque.

8. The invention defined in claim 7, and time-delay means to delay the initial rise of said clutch apply pressure relative to the initial rise of torque demand of said second torque demand signal to increase the slip time of said main clutch.

9. In a drive train: an input; an intermediate shaft; an output; a fluid drive connecting said input and intermediate shaft; multiratio gear means connecting said intermediate shaft and said output, and having fluid operated means for establishing low and high ratio drives; a source of fluid under pressure including means to supply said fluid drive; input and output governor means providing an input and an output governor signal respectively proportional to intermediate shaft speed and output speed; first torque demand signal means providing a first torque demand signal concurrently proportional to engine torque demand; second torque demand signal means providing a second torque demand signal concurrently proportional to engine torque; shift valve means operatively connected to said source, said fluid operated means, said output governor means and said first torque demand signal means and operative in low position to connect said source of drive pressure to said fluid operated means to establish said low ratio drive, and in a high position to connect said source of drive pressure to said fluid operated means to establish said high ratio drive, operative to upshift from said low position to said high position in response to said output governor signal and said first torque demand signal at predetermined output speeds increasing with increasing torque demand of said first torque demand signal; boost regulator valve means connected to said fluid pressure source and to said second torque demand signal means and to said input governor means operative to provide a regulated trim boost pressure concurrent with and proportional to said second torque demand signal and to said input governor signal; and trimmer valve means connected to said shift valve means, said fluid operated means and said boost regulator valve means operative to control the forces of engagement of said fluid operated means in said low and said high drives concurrent with and in proportion to said trim boost pressure so that the forces of engagement are concurrent with and proportional to said second torque demand signal and to said input governor signal.

10. In a drive train: an input; an intermediate shaft; an output; a fluid drive connecting said input and intermediate shaft; a drive clutch connecting said input and intermediate shaft having a fluid actuator for engaging said drive clutch; multiratio gear means connecting said intermediate shaft and said output, and having fluid operated means for establishing low and high ratio drives; a source of fluid under pressure including means to supply said fluid drive; input and output governor means providing an input and an output governor signal respectively proportional to intermediate shaft speed and output speed; first torque demand signal means providing a first torque demand signal concurrently proportional to engine torque demand; second torque demand signal means providing a second torque demand signal concurrently proportional to engine torque; third torque demand signal means providing a third torque demand signal proportional to and having a small time delay period relative to engine torque; clutch control means regulating apply pressure concurrently proportional to said thrid torque demand signal and supplying clutch apply pressure to said fluid actuator to engage said drive clutch with a capacity concurrently proportional to said thrid torque signal; shift valve means operatively connected to said source, said fluid operated means, said output governor means and said first torque demand signal means and operative in low position to connect said source of drive pressure to said fluid operated means to establish said low ratio drive, and in a high position to connect said source of drive pressure to said fluid operated means to establish said high ratio drive, operative to upshift from said low position to said high position in response to said output governor signal and said first torque demand signal at predetermined output speeds increasing with increasing torque demand of said first torque demand signal; boost regulator valve means connected to said fluid pressure source and to said second torque demand signal means and to said input governor means operative to provide a regulated trim boost pressure concurrent with and proportional to said second torque demand signal and to said input governor signal; and trimmer valve means connected to said shift valve means, said fluid operated means and said boost regulator valve means operative to control the forces of engagement of said fluid operated means in said low and said high drives concurrent with and in proportion to said trim boost pressure so that the forces of engagement are concurrent with and proportional to said second torque demand signal and to said input governor signal.

11. In a drive train: an input; an intermediate shaft; an output; an engine having power-generating means driving said input; fuel feed means for supplying fuel to said power generating means; engine torque demand signal means controlling said fuel feed means to increase the supply of fuel to said power-generating means concurrently with increasing engine torque demand signal for, after a time-delay period, increasing engine torque delivered to said input, and engine torque signal means connected to said power-generating means providing an engine torque signal increasing concurrently with engine torque; a fluid drive connecting said input and intermediate shaft; multiratio gear means connecting said intermediate shaft and said output, and having fluid operated means for establishing low and high ratio drives; a source of fluid under pressure including means to supply said fluid drive; input and output governor means providing an input and an output governor signal respectively proportional to intermediate shaft speed and output speed; first torque demand signal means providing a first torque demand signal concurrently proportional to said engine torque demand signal; second torque demand signal means providing a second torque demand signal concurrently proportional to said engine torque signal; shift valve means operatively connected to said source, said fluid operated means, said output governor means and said first torque demand signal means and operative in low position to connect said source of drive pressure to said fluid operated means to establish said low ratio drive, and in a high position to connect said source of drive pressure to said fluid operated means to establish said high ratio drive, operative to upshift from said low position to said high position in response to said output governor signal and said first torque demand signal at predetermined output speeds increasing with increasing torque demand of said first torque demand signal; boost regulator valve means connected to said fluid pressure source and to said second torque demand signal means and to said input governor means operative to provide a regulated trim boost pressure concurrent with and proportional to said second torque demand signal and to said input governor signal; and trimmer valve means connected to said shift valve means, said fluid operated means and said boost regulator valve means operative to control the forces of engagement of said fluid operated means in said low and said high drives concurrent with and in proportion to said trim boost pressure so that the forces of engagement are concurrent with and proportional to said second torque demand signal and to said input governor signal.

12. In a drive train: an input; an intermediate shaft; an output; an engine havng power-generating means driving said input; fuel feed means for supplying fuel to said power-generating means; engine torque demand signal means controlling said fuel feed means to increase the supply of fuel to said power-generating means concurrently with increasing engine torque demand signal for, after a time-delay period, increasing engine torque delivered to said input, and engine torque signal means connected to said power-generating means providing an engine torque signal increasing concurrently with engine torque; a fluid drive connecting said input and intermediate shaft and having a low capacity to control engine idle speed; a drive clutch connecting said input and intermeidate shaft having a fluid actuator for engaging said drive clutch; multiratio gear means connecting said intermediate shaft and said output, and having fluid operated means for establishing low and high ratio drives; a source of fluid under pressure including means to supply said fluid drive; input and output governor means providing an input and an output governor signal respectively proportional to intermediate shaft speed and output speed; first torque demand signal means providing a first torque demand signal concurrently proportional to said engine torque demand signal; second torque demand signal means providing a second torque demand signal concurrently proportional to said engine torque signal; third torque demand signal means providing a third torque demand signal proportional to and having a small time-delay period relative to said engine torque signal; clutch control means regulating apply pressure concurrently proportional to said third torque demand signal and supplying clutch apply pressure to said fluid actuator to engage said drive clutch with a capacity concurrently proportional to said third torque demand signal; shift valve means operatively connected to said source, said fluid operated means, said output governor means and said first torque demand signal means and operative in low position to connect said source of drive pressure to said fluid operated means to establish said low ratio drive, and in a high position to connect said source of drive pressure to said fluid operated means to establish said high ratio drive, operative to upshift from said low position to said high position in response to said output governor signal and said first torque demand signal at predetermined output speeds increasing with increasing torque demand of said first torque demand signal; boost regulator valve means connected to said fluid pressure source and to said second torque demand signal means and to said input governor means operative to provide a regulated trim boost pressure concurrent with and poroprtional to said second torque demand signal and to said input governor signal; and trimmer valve means connected to said shift valve means, said fluid operated means and said boost regulator valve means operative to control the forces of engagement of said fluid operated means in said low and said high drives concurrent with and in proportion to said trim boost pressure so that the forces of engagement are concurrent with and proportional to said second torque demand signal and to said input governor signal.

* * * * *